United States Patent
Yu et al.

(10) Patent No.: US 7,349,494 B2
(45) Date of Patent: Mar. 25, 2008

(54) METHOD AND APPARATUS FOR RECEIVING AND DESHUFFLING SHUFFLED DATA IN A HIGH-RATE PACKET DATA TELECOMMUNICATION SYSTEM

(75) Inventors: Nam-Yul Yu, Suwon-shi (KR); Sang-Hyuck Ha, Suwon-shi (KR); Min-Goo Kim, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 625 days.

(21) Appl. No.: 10/671,553

(22) Filed: Sep. 29, 2003

(65) Prior Publication Data
US 2004/0062318 A1    Apr. 1, 2004

(30) Foreign Application Priority Data
Sep. 30, 2002    (KR) .................. 10-2002-0059419

(51) Int. Cl.
*H04L 27/00*    (2006.01)
(52) U.S. Cl. .................. 375/324; 341/81; 714/6
(58) Field of Classification Search ................ 375/324; 341/81; 714/6
See application file for complete search history.

(56) References Cited

U.S. PATENT DOCUMENTS

| | | | | |
|---|---|---|---|---|
| 4,523,323 A | | 6/1985 | Nakajima et al. .............. 375/37 |
| 5,233,479 A | | 8/1993 | Nakatsu et al. ................ 360/29 |
| 5,396,504 A | * | 3/1995 | Pack ........................... 714/755 |
| 6,553,534 B2 | * | 4/2003 | Yonge et al. ................. 714/774 |
| 6,745,319 B1 | * | 6/2004 | Balmer et al. ............... 712/223 |
| 6,952,458 B1 | * | 10/2005 | Djokovich et al. ......... 375/341 |
| 6,975,692 B2 | * | 12/2005 | Razzell ........................ 375/341 |
| 2003/0126550 A1 | * | 7/2003 | Stralen et al. ............... 714/786 |
| 2003/0162542 A1 | * | 8/2003 | Shoji et al. .................. 455/435 |

FOREIGN PATENT DOCUMENTS

| | | |
|---|---|---|
| EP | 0458385 | 7/1997 |
| EP | 1075088 | 2/2001 |
| EP | 1182839 | 2/2002 |

(Continued)

OTHER PUBLICATIONS

Tdoc R1-02-0024 "Text Proposal for SMP (Symbol Mapping Based on Bit Priority)", TSG-RAN WG1 #23, Espoo; Finland; Jan. 8-11, 2002.

*Primary Examiner*—Curtis B. Odom
(74) *Attorney, Agent, or Firm*—Roylance, Abrams, Berdo & Goodman L.L.P.

(57) ABSTRACT

A method and apparatus for deshuffling received shuffled data in a communication system supporting multi-level modulation. A transmitter encodes information bits and shuffles code symbols so that systematic symbols having a relatively high priority are disposed at high-transmission reliability positions and parity symbols having a relatively low priority are disposed at low-transmission reliability positions in a modulation symbol. A receiver demodulates received data and outputs a modulation symbol having a plurality of code symbols, stores the code symbols separately as systematic symbols and parity symbols in corresponding memory areas according to a deshuffling order corresponding to the shuffling, reads the stored code symbols, decodes the stored code symbols at a predetermined code rate, and thus outputs an packet.

20 Claims, 17 Drawing Sheets

FOREIGN PATENT DOCUMENTS

| | | |
|---|---|---|
| JP | 2002-164948 | 6/2002 |
| JP | 2002-171298 | 6/2002 |
| WO | WO 00/64073 | 10/2000 |
| WO | WO0141313 | 6/2001 |
| WO | WO 01/67617 | 9/2001 |

* cited by examiner

| EP SIZE | POSSIBLE KINDS OF CODE SYMBOLS IN EACH EP SIZE | CODE RATE |
|---|---|---|
| 408 | S \| P0 \| P0 \| P1 \| P1' — 816; 408, 816 | 0.2000 |
| 792 | S \| P0 \| P0' \| P1 \| P1' — 1584; 792, 1584 | 0.2000 |
| 1560 | S — 1560; P0 \| P0' — 3120 | 0.2000 |
| 2328 | S — 2328; P0 \| P0' — 2328; P1 \| P1' 408, 408 | 0.2985 |
| 3096 | S — 3096; P0 — 2352; P0' — 2352 | 0.3969 |
| 3864 | S — 3864; P0 — 1968; P0' — 1968 | 0.4954 |

Legend: □ SYSTEMATIC   ▦ PARITY 0 / PARITY 0'   ▨ PARITY 1 / PARITY 1'

FIG.5

METHOD AND APPARATUS FOR RECEIVING AND DESHUFFLING SHUFFLED DATA IN A HIGH-RATE PACKET DATA TELECOMMUNICATION SYSTEM

PRIORITY

This application claims priority under 35 U.S.C. § 119 to an application entitled "Method and Apparatus for Receiving Shuffled Data in a High-Rate Packet Data Telecommunication System" filed in the Korean Intellectual Property Office on Sep. 30, 2002 and assigned Serial No. 2002-59419, the contents of which are incorporated herein by reference.

BACKGROUND OF THE INVENTION

1. Field of the Invention

The present invention relates generally to a high-rate packet data telecommunication system using multi-level demodulation, and in particular, to a method and apparatus for deshuffling shuffled data to the original data.

2. Description of the Related Art

A typical mobile communication system provides integrated support for voice service, circuit data, and low-rate (e.g., 14.4 kbps or lower) packet data. As user demand for high-rate packet data transmission such as Internet browsing and moving pictures has increased, the mobile communication system has been developed to support the high-rate packet data service.

Code Division Multiple Access2000 (CDMA2000), Universal Mobile Telecommunication Service (UMTS), and Wideband-CDMA (W-CDMA), which were proposed for the high-rate packet data service, adopt multi-level modulation in order to increase spectral efficiency. Multi-level modulation schemes include 8-ary Phase Shift Keying (8-PSK), 16-ary Quadrature Amplitude Modulation (16-QAM), and 64-ary QAM (64-QAM) which have higher modulation levels than Quadrature Phase Shift Keying (QPSK). These multi-level modulation schemes transmit a lot of information in each modulation symbol. They enable the high-rate packet data service, but require increased stable circuit quality.

In multi-level modulation, bits in one modulation symbol have different reliabilities. The different reliabilities lead to different average Bit Error Rates (BERs) at different bit positions. Codeword sequences output from a channel encoder having a plurality of constituent encoders such as a turbo encoder are divided into systematic symbols with a relatively high priority and parity symbols with a relatively low priority. Therefore, the systematic symbols are arranged at bit positions having a relatively high reliability and the parity symbols at bit positions having a relatively low priority in a modulation symbol, to thereby reduce the error rate of an information sequence in a receiver.

If a transmitter rearranges code sequences as described above, the receiver must recover the original information sequences. Since a system that processes a large volume of packet data at high rates usually has a data path for each data process unit, it needs a buffer for each data process unit.

As the number of buffers for data paths is increased in the receiver, time spent processing whole data is increased significantly. Moreover, when the transmitter shuffles code symbols prior to transmission, an additional buffer for deshuffling is required between demodulators for the data receiving paths and a decoder. As a result, data processing is delayed. Hence, there is a need for a method of efficiently using a deshuffling buffer and shortening a process time in deshuffling received shuffled data in a mobile communication system supporting high-rate packet data service.

SUMMARY OF THE INVENTION

It is, therefore, an object of the present invention to provide a method and apparatus for rapidly recovering received shuffled data at a receiver in a communication system using multi-level modulation.

It is another object of the present invention to provide a method and apparatus for separately storing received data according to its priority level at a receiver in a communication system using multi-level modulation.

It is a further object of the present invention to provide a method and apparatus for storing received data at write addresses generated for deshuffling at a receiver in a communication system using multi-level modulation.

It is still another object of the present invention to provide a method and apparatus for storing received shuffled data in a deshuffling order to process the data rapidly.

The above objects are achieved by an apparatus and method for receiving encoded and then shuffled data from a transmitter in a communication system supporting multi-level demodulation.

According to one aspect of the present invention, in the shuffled data receiving method, received data is demodulated according to a predetermined demodulation scheme and a modulation symbol having a predetermined number of code symbols is output. The code symbols are deshuffled in a deshuffling order corresponding to the manner in which they were shuffled. Here, the deshuffling order is determined considering the modulation scheme and a structure of a deshuffling memory device where the code symbols are stored while being deshuffled. The deshuffled code symbols are read, decoded at a predetermined code rate, and output as an encoded packet of a predetermined size.

According to another aspect of the present invention, in the shuffled data receiving apparatus, a demodulator demodulates received data according to a predetermined demodulation scheme and outputs a modulation symbol having a predetermined number of code symbols. A storage stores the code symbols in a deshuffling order corresponding to shuffling. Here, the deshuffling order is determined considering the demodulation scheme and the structure of the storage. A decoder reads the stored code symbols, decodes the code symbols at a predetermined code rate, and outputs an encoded packet.

BRIEF DESCRIPTION OF THE DRAWINGS

The above and other objects, features and advantages of the present invention will become more apparent from the following detailed description when taken in conjunction with the accompanying drawings in which:

FIG. 5 is a diagram illustrating an example of symbol compositions of packet data for transmittable packet sizes;

DETAILED DESCRIPTION OF THE PREFERRED EMBODIMENT

An embodiment of the present invention will be described herein below with reference to the accompanying drawings. In the following description, well-known functions or constructions have been omitted for conciseness.

In accordance with an embodiment of the present invention, a transmitter shuffles systematic symbols with a relatively high priority and parity symbols with a relatively low priority in a codeword sequence output from a channel encoder, in consideration of different reliabilities of bits in a multi-level modulation scheme. A demodulator in a receiver deshuffles the shuffled data to the original data. Especially, the embodiment of the present invention pertains to the structure of a buffer for storing demodulated data and generation of write addresses for the buffer according to a deshuffling rule.

The embodiment of the present invention is applied to mobile communication systems adopting multi-level modulations having different reliabilities at bit positions in one modulation symbol, that is, 8-Phase Shift Keying (PSK), 16-PSK, and 64-Quadrature Amplitude Modulation (QAM). While the following description is made in the context of a Code Division Multiple Access 1×Evolution Data and Voice (CDMA 1×EV-DV) system, it should be appreciated that the embodiment of the present invention can be implemented in other mobile communication systems with similar technological backgrounds and similar system configurations, with some modifications within the scope and spirit of the present invention.

The term "shuffling" herein is defined as positioning of relatively significant symbols (i.e., systematic symbols) in relatively reliable bit positions within a modulation symbol and positioning of relatively insignificant symbols (i.e., parity symbols) in relatively unreliable bit positions. Hence, the term "deshuffling" is defined as recovering shuffled symbols to their original positions.

Figure 1:
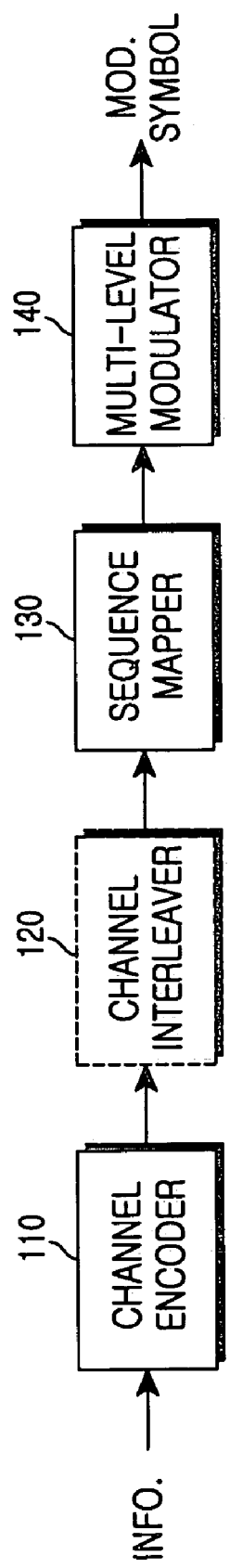
FIG. 1 is a block diagram illustrating an example of a transmitter including a sequence mapper for sequence shuffling according to an embodiment of the present invention.

FIG. 1 is a block diagram illustrating an example of a transmitter including a sequence mapper for sequence shuffling according to an embodiment of the present invention.

Referring to FIG. 1, a channel encoder 110 encodes an input information bit stream at a predetermined code rate and outputs a codeword sequence. For example, the channel encoder 110 can be a turbo encoder. In this case, the code symbols of the codeword sequence are divided into relatively more significant systematic symbols and relatively less significant parity symbols. A channel interleaver 120 interleaves the codeword sequence according to a predetermined interleaving rule.

A sequence mapper 130 separately shuffles the interleaved codeword sequence as systematic symbols and parity symbols. The sequence mapper 130 can also shuffle the codeword sequence before interleaving. For notational simplicity, both the interleaved codeword sequence and the non-interleaved codeword sequence are indiscriminately called codeword sequences.

A modulator 140 modulates the shuffled codeword sequence in a predetermined modulation scheme. The modulator 140 supports a multi-level modulation scheme such as 8-PSK, 16-PSK and 64-QAM. The shuffling in the sequence mapper 130 depends on the modulation of the modulator 140. If the modulator 140 uses one of 8-PSK, 16-PSK and 64-QAM, the sequence mapper 130 shuffles correspondingly due to the modulation schemes differing in the number of bits in a modulation symbol and in the high-reliability/low-reliability bit positions.

Figure 2:
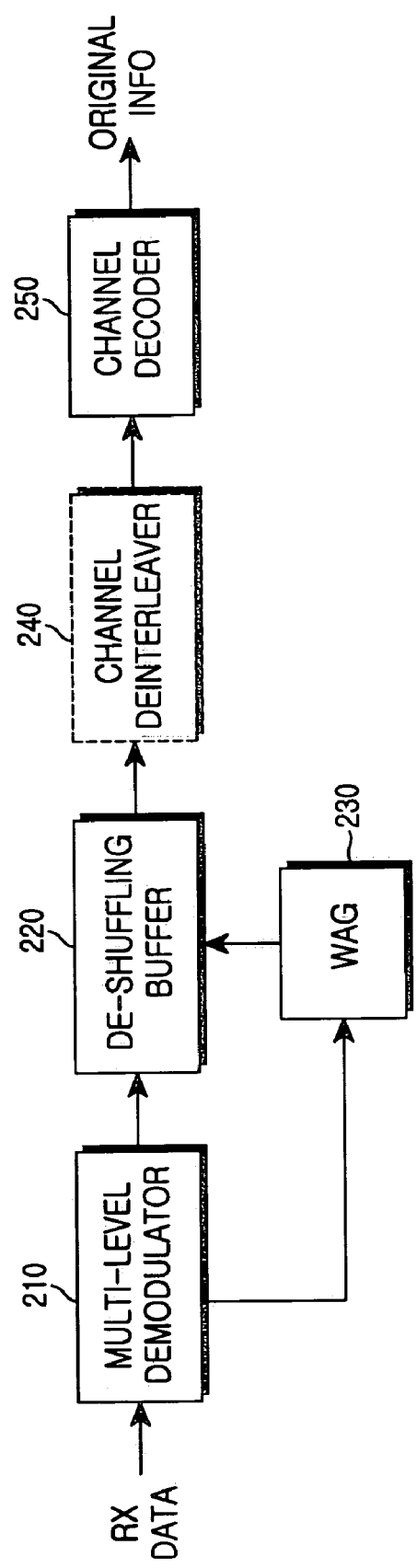
FIG. 2 is a block diagram illustrating an example of a receiver including a sequence demapper according to the embodiment of the present invention.

FIG. 2 is a block diagram illustrating an example of a receiver including a sequence demapper according to the embodiment of the present invention. The receiver is the counterpart of the transmitter illustrated in FIG. 1 and includes components for performing the reverse operations of their counterparts in the transmitter.

Referring to FIG. 2, a demodulator 210 demodulates the received data that has been modulated by the modulator 140 according to a modulation scheme that is exactly a demodulation scheme corresponding to a modulation scheme of multi-level modulator 140. Demodulated symbols are stored in a deshuffling buffer at write addresses generated from a write address generator (WAG) 230. In accordance with shuffling that was performed by the sequence mapper 130, the WAG 230 generates the write addresses at which the demodulated symbols are stored in an order of deshuffling based on the original codeword sequence in the deshuffling buffer 220. The structure of the deshuffling buffer 220 and the operation of the WAG 230 will be described in detail later.

A channel deinterleaver 240 deinterleaves the data in accordance with the manner in which they were interleaved by the channel interleaver 120 sequentially reads the data from the deshuffling buffer. A channel decoder 250 decodes the output of the channel deinterleaver 240, in correspondence with the channel encoder 110. The channel decoder 250 is, for example, a turbo decoder.

Before describing the structure of the deshuffling buffer 220, data shuffling and deshuffling will be described in more detail. As described before, bits differ in reliability within one modulation symbol in a multi-level modulation scheme because the bits of the modulation symbol mapped to predetermined positions on an I-Q plane have different error probabilities due to their different distances to their inversion bit positions to which they are brought by noise.

For 8-PSK, one modulation symbol contains three bits. Two bits have the same reliability, whereas the other one bit has a lower reliability. For 16-QAM, one modulation symbol contains four bits. Two bits have a higher priority than the other two. For 64-QAM, one modulation symbol contains six bits. One pair of bits is higher than another bit pair and lower than the other bit pair, in terms of priority. The positions of bits having different reliabilities depend on the modulation/demodulation signal constellation.

Figure 3:
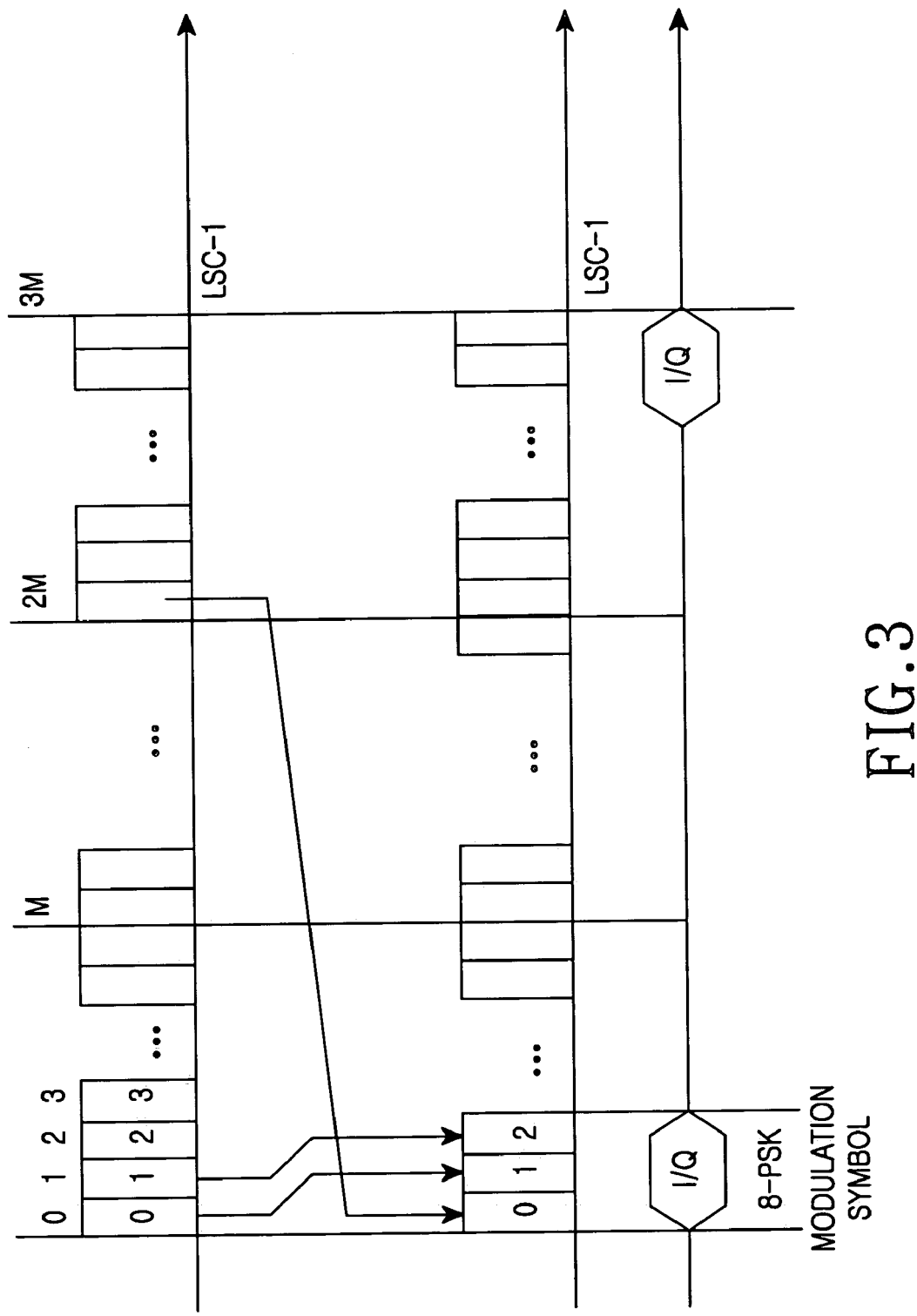
FIGS. 3 and 4 are diagrams illustrating examples of symbol mapping through data shuffling for 8-Phase Shift Keying (PSK) and 16-Quadrature Amplitude Modulation (QAM), respectively.
Figure 4:
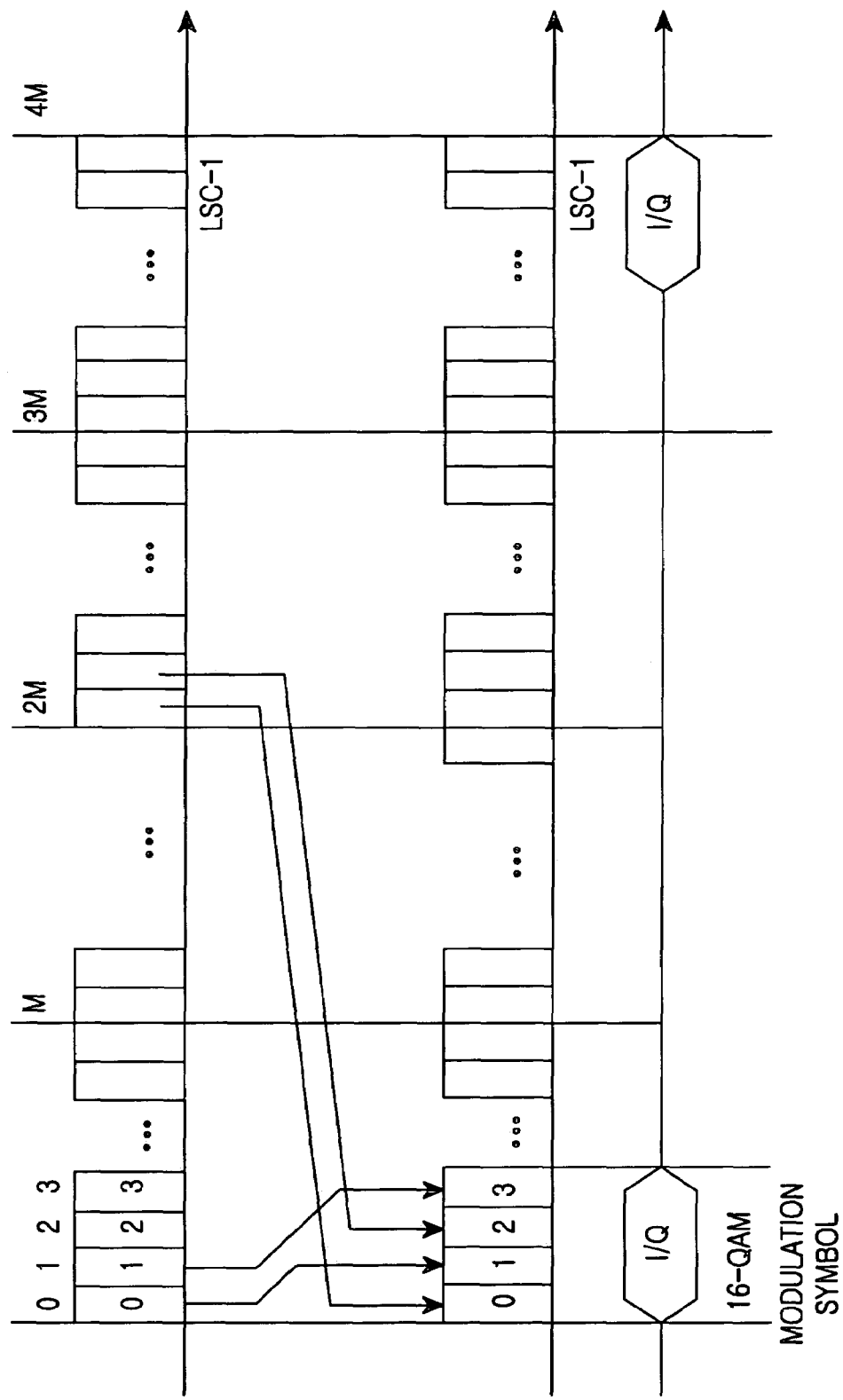

Examples of symbol mapping through data shuffling for 8-PSK and 16-QAM are illustrated respectively in FIGS. 3 and 4.

Referring to FIG. 3, systematic symbols are followed by parity symbols in a codeword sequence. For 8-PSK, the first bit position has a lower reliability than the other two bit positions. Thus, systematic symbols are mapped to the last two bit positions, while a parity symbol is mapped to the first one bit position. In modulating the same codeword sequence by 16-QAM as illustrated in FIG. 4, systematic symbols are mapped to the second and fourth bit positions, while parity symbols are mapped to the first and third bit positions, because the first and third bit positions have a lower reliability of the second and fourth bit positions.

A transmittable packet size for a transmitter is determined by the number of Walsh codes used, the number of occupied time slots, and a modulation scheme used. In general, packet data is a repetition of a part or the whole of a codeword sequence, or both. For example, a turbo encoder with a mother code rate of 1/5 outputs a codeword sequence of systematic symbols S, first parity symbols P0/P0', and second parity symbols P1/P1', for the input of an encoded packet (EP) of a predetermined size. Packet data is a repetition of a part or the whole of the code symbols S, P0, P0', P1/P1'. Here, the symbols are all the same size as the EP.

FIG. 5 illustrates symbol compositions of packet data for transmittable packet sizes. It is assumed here that a maximum transmittable packet size is 7800 bits.

Referring to FIG. 5, for a code rate of 0.2000 and EP sizes of 408, 792, and 1560 bits, one packet can deliver all of the systematic symbols S and the first and second parity symbols P0, P0', P1/P1'. Therefore, various packet data can be formed at each retransmission by repeating the whole or the whole and a selected part of the symbols. On the other hand, for EP sizes of 2328, 3096, and 3894 bits, some bits are always deselected and packet data is generated using a selected part or by repeating the selected part. A receiver then recovers the original information bit stream from the selected part.

Let an EP size be $N_{EP}$. Then a codeword sequence generated from a turbo encoder with a code rate of 1/5 is $5 \times N_{EP}$ long. Considering that a transmittable packet size is 7800 bits, the whole of the codeword sequence can be selected to form packet data when an EP size is one of 408, 792, and 1560 bits. On the contrary, only a part of the codeword sequence can be selected when an EP size is one of 2328, 3096 and 3864 bits.

Thus, if an EP size is 1560 bits or less, packet data includes S, P0, p0', P1, and P1'. On the other hand, if the EP size is 2328 bits, the packet data includes only the whole of S, P0, and P0', and a part of P1/P1'. If the EP size is 3096 or 3864 bits, the packet data is formed with only the whole of S and a part of P0/P0'.

Preferably, recovery of the original information bit stream in a decoder takes all the systematic symbols, first and second parity symbols. If all of these symbols are stored in one memory, the decoder needs three symbol clocks to read all the symbols. Hence, the systematic symbols and parity symbols are stored in different memories, and the parity symbols P0/P0', and P1/P1' are further separated in different memories, for faster decoding, though they are read by two constituent decoders of the same structure in an embodiment of the present invention.

To store demodulated packet data separately as systematic symbols, first parity symbols, and second parity symbols, the receiver adopts the deshuffling buffer 220 having three Random Access Memories (RAMs). The memories store the systematic symbols S, the first parity symbols P0/P0', and the second parity symbols P1/P1', respectively. Consequently, the decoder 250 can receive S, P0/P0', and P1/P1' simultaneously.

Figure 6:
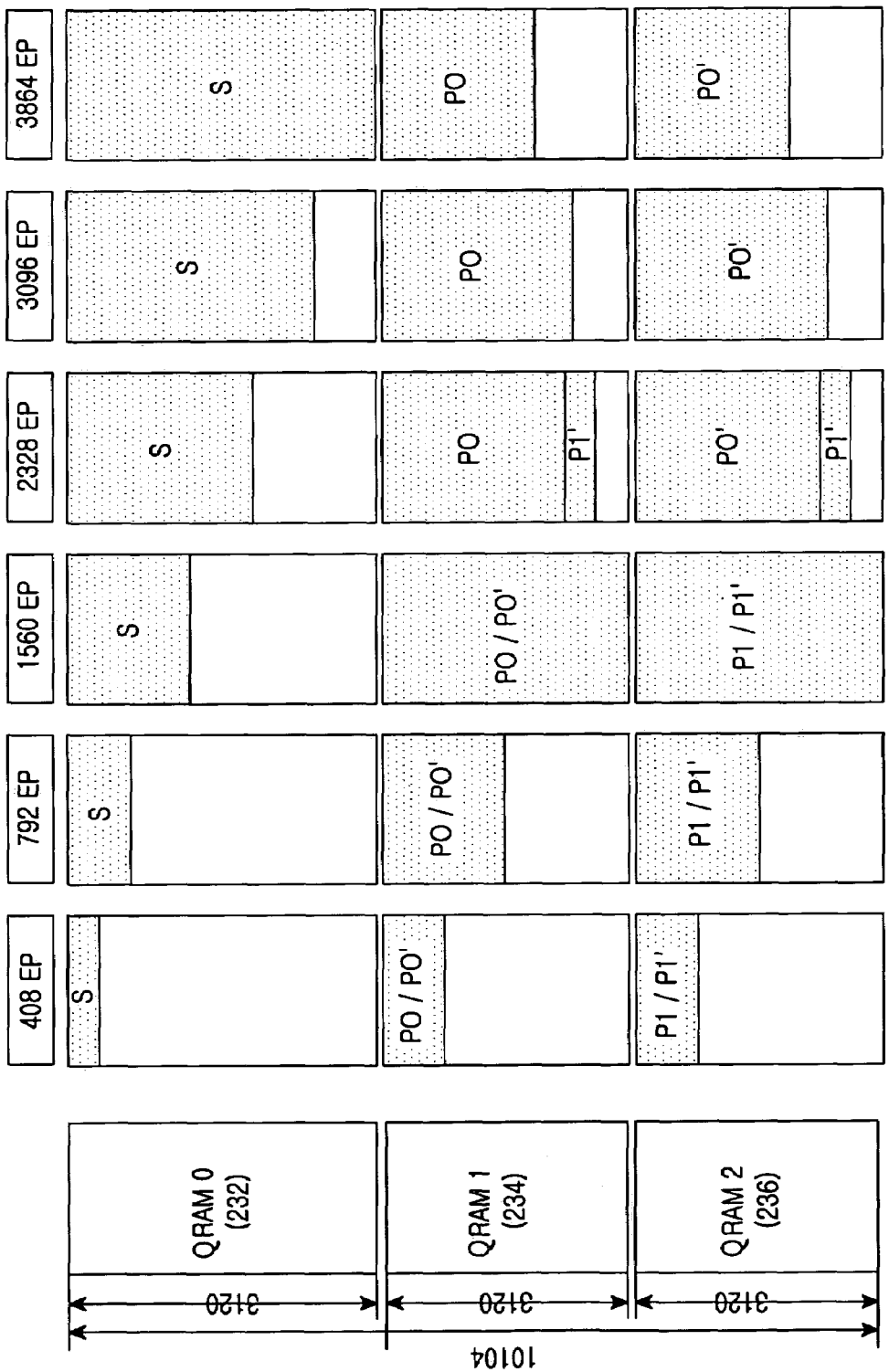
FIG. 6 is a diagram illustrating an example of the structure of a deshuffling buffer for storing packet data separately as systematic symbols and parity symbols at a receiver according to the embodiment of the present invention.

FIG. 6 is a diagram illustrating an example of the structure of the deshuffling buffer for storing packet data separately as systematic symbols and parity symbols at the receiver according to the embodiment of the present invention.

Referring to FIG. 6, a first memory (QRAM0) 232 has a capacity of 3864 bits to accommodate systematic symbols of a maximum size. Second and third memories (QRAM1) 234 and (QRAM2) 236 each have a capacity of 3120 bits to accommodate whole received parity symbols of a maximum size.

For an EP size of 408 bits, systematic symbols S of 408 bits are stored in the first memory 232, first parity symbols P0/P0' of 816 bits are stored in the second memory 234, and second parity symbols P1/P1' of 816 bits are stored in the third memory 236. For an EP size of 792 bits, systematic symbols S of 792 bits are stored in the first memory 232, first parity symbols P0/P0' of 1584 bits are stored in the second memory 234, and second parity symbols P1/P1' of 1584 bits are stored in the third memory 236. For an EP size of 1560 bits, systematic symbols S of 1560 bits are stored in the first memory 232, first parity symbols P0/P0' of 3120 bits are stored in the second memory 234, and second parity symbols P1/P1' of 3120 bits are stored in the third memory 236.

On the other hand, for an EP size of 2328 bits or more, whole parity symbols are not received due to the limited length of packet data. Therefore, the second and third memories 234 and 236 store the first parity symbols P0/P0' wholly or partially, in conjunction with each other so that a turbo decoder can recover the original information bit stream with only the first parity symbols P0/P0' without the second parity symbols P1/P1' in view of the nature of turbo decoding. In the remaining areas of the second and third memories 234 and 236, part of the second parity symbols P1/P1' are stored, thereby improving decoding performance, as compared to storing only the first parity symbols P0/P0'.

More specifically, for an EP size of 2328 bits, systematic symbols S of 2328 bits are stored in the first memory 2332, first parity symbols P0/P0' of 2328×2 bits are separately stored in the second and third memories 234 and 236, and a 408-bit part of second parity symbols P1/P1' are stored in the remaining areas of the second and third memories 234 and 236. For an EP size of 3096 bits, systematic symbols S of 3096 bits are stored in the first memory 2332, and first parity symbols P0/P0' of 3096×2 bits are separately stored in the second and third memories 234 and 236. For an EP-size of 3864 bits, systematic symbols S of 3864 bits are stored in the first memory 2332, and a 1968×2-bit part of first parity symbols P0/P0' of 3864×2 bits are separately stored in the second and third memories 234 and 236.

Now, the operation principle of the WAG 230 according to the embodiment of the present invention will be described below.

For high-rate data processing in the receiver, deshuffling of one modulation symbol must be performed by storing data at write addresses generated for the deshuffling buffer 220. The write addresses are generated in the following steps: (1) generation of temporary addresses (TAs) for data deshuffling only with no regard to the structure of the deshuffling buffer; and (2) generation of final write addresses (WAs) considering the deshuffling buffer structure having three memories for storing systematic symbols and first and second parity symbols separately. Therefore, the WAG 230 is divided into a TA generation portion and a WA generation portion.

Although data shuffling and deshuffling is related to multi-level modulation having a modulation level equal to or higher than 8-PSK, address generation for QPSK, 8-PSK, and 16-QAM will be described below. Since the transmitter selects one of QPSK, 8-PSK, and 16-QAM for each transmission adaptively according to radio channel condition, the receiver must support all these modulation schemes.

1. TA Generation

In order to involve deshuffling of demodulated symbols in address generation, TAs are generated according to the modulation scheme that is used. TA generation formulas for QPSK, 8-PSK, and 16-QAM are given as follows.

$$QPSK: TA=(SA+2\times mi+ci) \bmod P_{MAX} \quad (1)$$

$$8\text{-}PSK: \text{if } ci=0, TA=(SA+mi+2N_{SP}/3) \bmod P_{MAX} \text{ else},$$
$$TA=(SA+2\times mi+ci-1) \bmod P_{MAX} \quad (2)$$

$$16\text{-}QAM: \text{if } ci \bmod 2=0, TA=(SA+2\times mi+ci/2+N_{SP}/2)$$
$$\bmod P_{MAX} \text{ else}, TA=(SA+2\times mi+ci/2) \bmod P_{MAX} \quad (3)$$

where SA is a start address depending on the index of received packet data, mi is the index of a modulated symbol, and ci is the index of a code symbol in the modulated symbol. For a given mi, ci is 0 or 1 in QPSK, 0, 1 or 2 in 8-PSK, and 0, 1, 2, or 3 in 16-QAM. $N_{SP}$ denotes the length of the received packet data and $P_{MAX}$ is the maximum bit index of packet data generated from a code sequence according to an EP size. For an EP size ($N_{EP}$) of 408, 792, or 1560, $P_{MAX}$ is $5\times N_{EP}$. For $N_{EP}$ of 2328, 3096, or 3864, $P_{MAX}$ is the transmittable maximum packet data size, 7800 bits here. Mod represents modulo operation.

Figure 7:
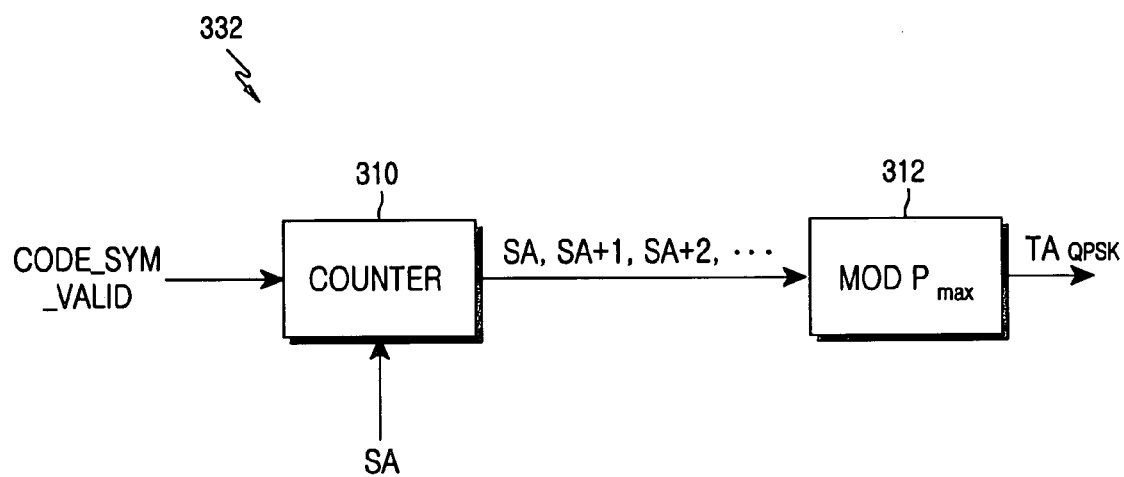
FIG. 7 is a block diagram illustrating an example of a first Temporary Address (TA) generator for generating TAs for Quadrature Phase Shift Keying (QPSK) according to the embodiment of the present invention.

FIG. 7 is a block diagram illustrating an example of the structure of a first TA generator 314 for generating TAs for QPSK symbols according to the embodiment of the present invention. Since no data shuffling occurs for QPSK, TAs are generated by Eq. (1), as illustrated.

Each time a clock signal CODE_SYM_VALID indicating completed demodulation of the demodulator 210 is applied, a counter 310 counts one by one, starting from a 13-bit start address SA and sequentially outputs SA, SA+1, SA+2, ..., each having 14 bits. A modulo operator 312 modulo-operates the output of the counter 310 with $P_{MAX}$ and outputs the modulo-operated value as a 13-bit TA.

Figure 8:
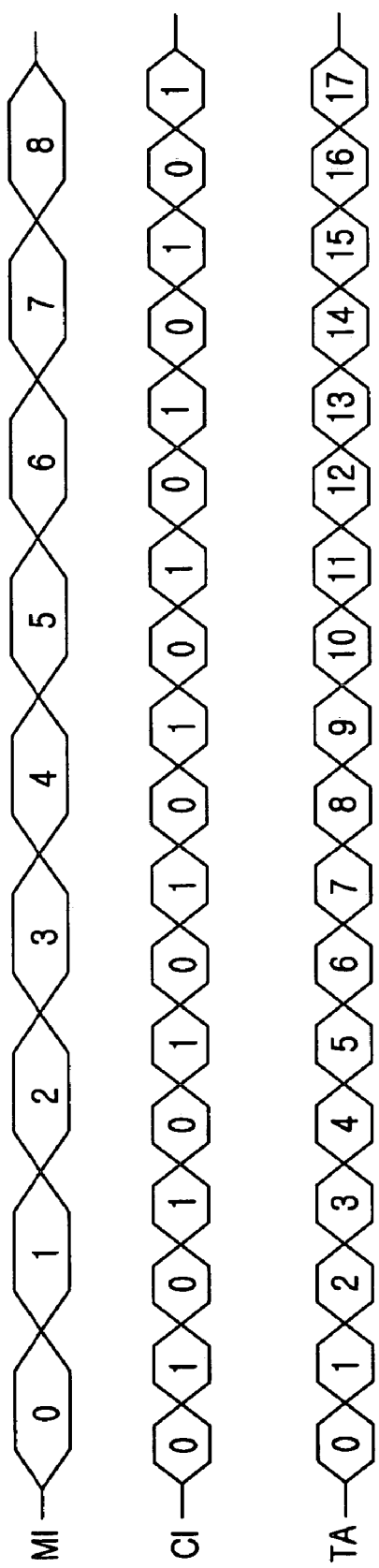
FIG. 8 is a diagram illustrating an example of TAs generated from the first TA generator illustrated in FIG. 7.

Given mi and ci, the first TA generator 314 generates TAs as illustrated in FIG. 8. TAs for QPSK are simple sequential count values.

Figure 9:
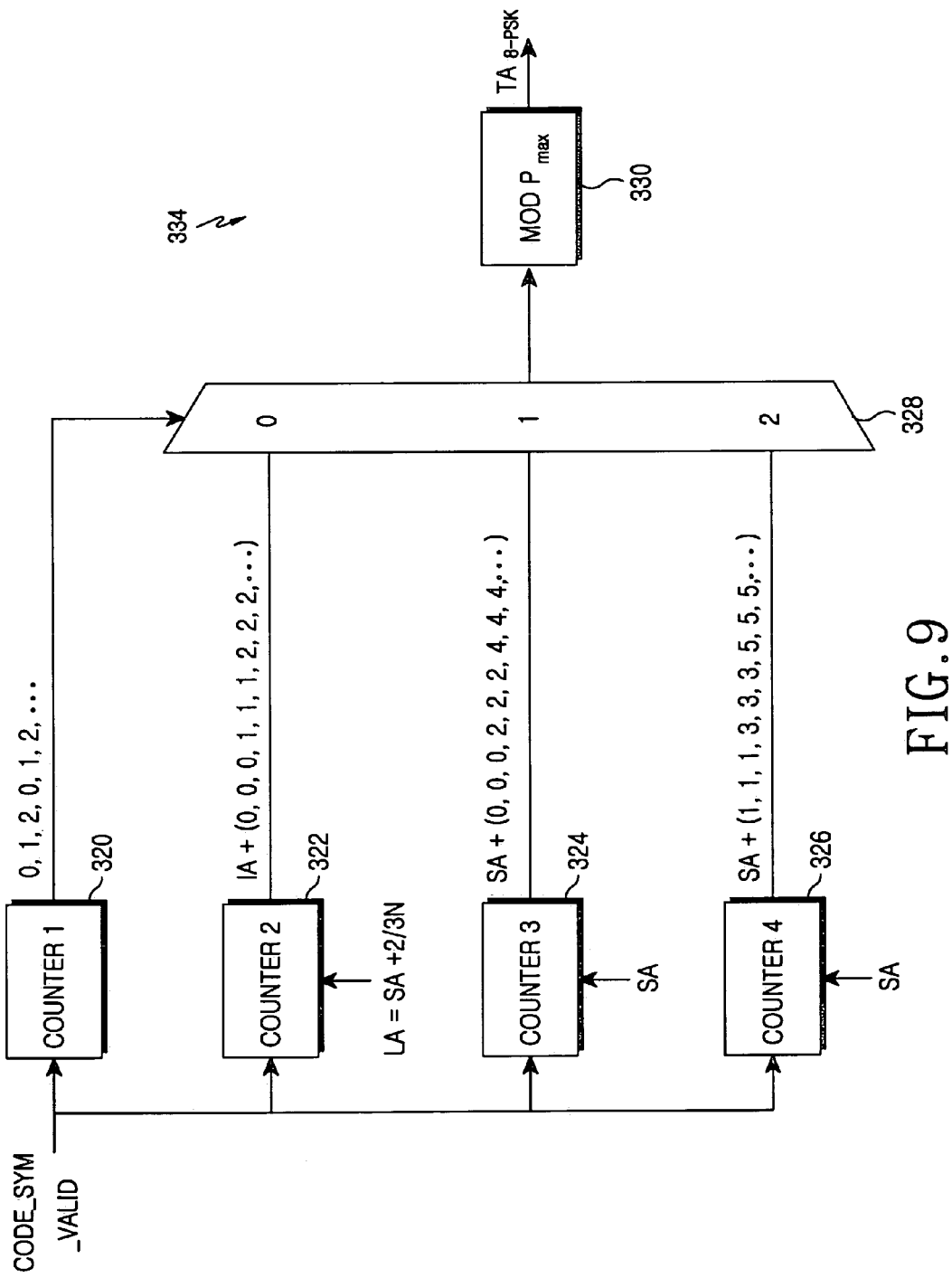
FIG. 9 is a block diagram illustrating an example of a second TA generator for generating TAs for 8-PSK according to the embodiment of the present invention.

FIG. 9 is a block diagram illustrating an example of a second TA generator 332 for generating TAs for 8-PSK according to the embodiment of the invention. As illustrated, data deshuffling is performed by Eq. (2).

Each time the clock signal CODE_SYM_VALID is applied from the demodulator 210, first to fourth counters 320 to 326 generate different code symbol indexes ci in parallel. The first counter 320 starts with 0 and sequentially outputs 0, 1, 2, 0, 1, 2, .... The second counter 322 starts with IA defined as "SA+(⅔)$N_{EP}$" and sequentially outputs IA, IA, IA, IA+1, IA+1, IA+1, IA+2, IA+2, IA+2, ..., each having 14 bits. The third counter 324 starts with SA and sequentially outputs SA, SA, SA, SA+2, SA+2, SA+2, SA+4, SA+4, SA+4, ..., each having 14 bits. The fourth counter 326 starts with SA and sequentially outputs SA+1, SA+1, SA+1, SA+3, SA+3, SA+3, SA+5, SA+5, ..., each having 14 bits.

A selector 328 selects one of the outputs of the second, third and fourth counters 322, 324, and 326 according to the output of the first counter 320. A modulo operator 330 modulo-operates the output of the selector 328 with $P_{MAX}$ and outputs the modulo-operated value as a 13-bit TA ($TA_{8\text{-}PSK}$). Hence, the outputs of the second, third and fourth counters 322, 324 and 326 correspond to TAs when ci=0, 1 and 2, respectively.

Figure 10:
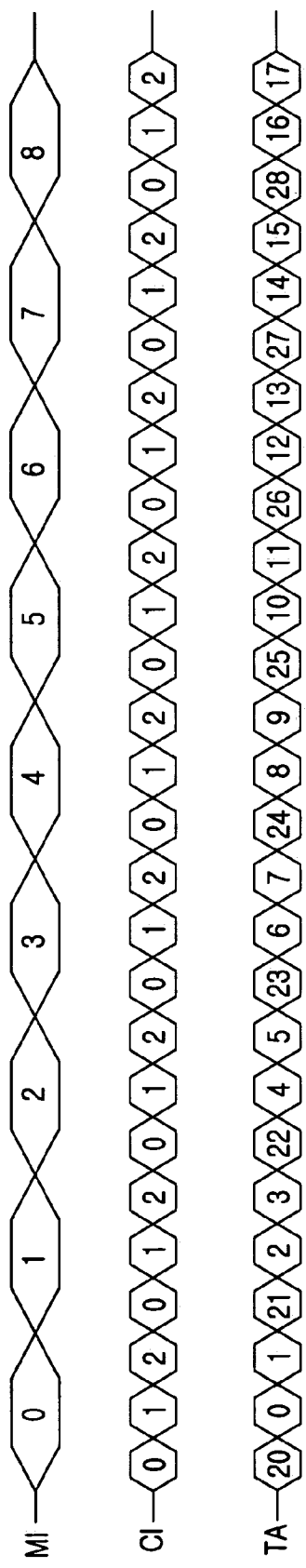
FIG. 10 is a diagram illustrating an example of TAs generated from the second TA generator illustrated in FIG. 9.

Given mi and ci, the second TA generator 324 generates TAs under the conditions that SA=0 and $N_{SP}$=30, as illustrated in FIG. 10. If mi=0 and ci=0, TA=$2\times N_{SP}/3$=20 by Eq. (2). Similarly, if mi=0 and ci=1, TA=0. That is, for ci-0, TA sequentially increases from the initial value $2\times N_{SP}/3$ according to mi. If ci is not 0, TA sequentially increases-from an initial value 0 according to mi.

Figure 11:
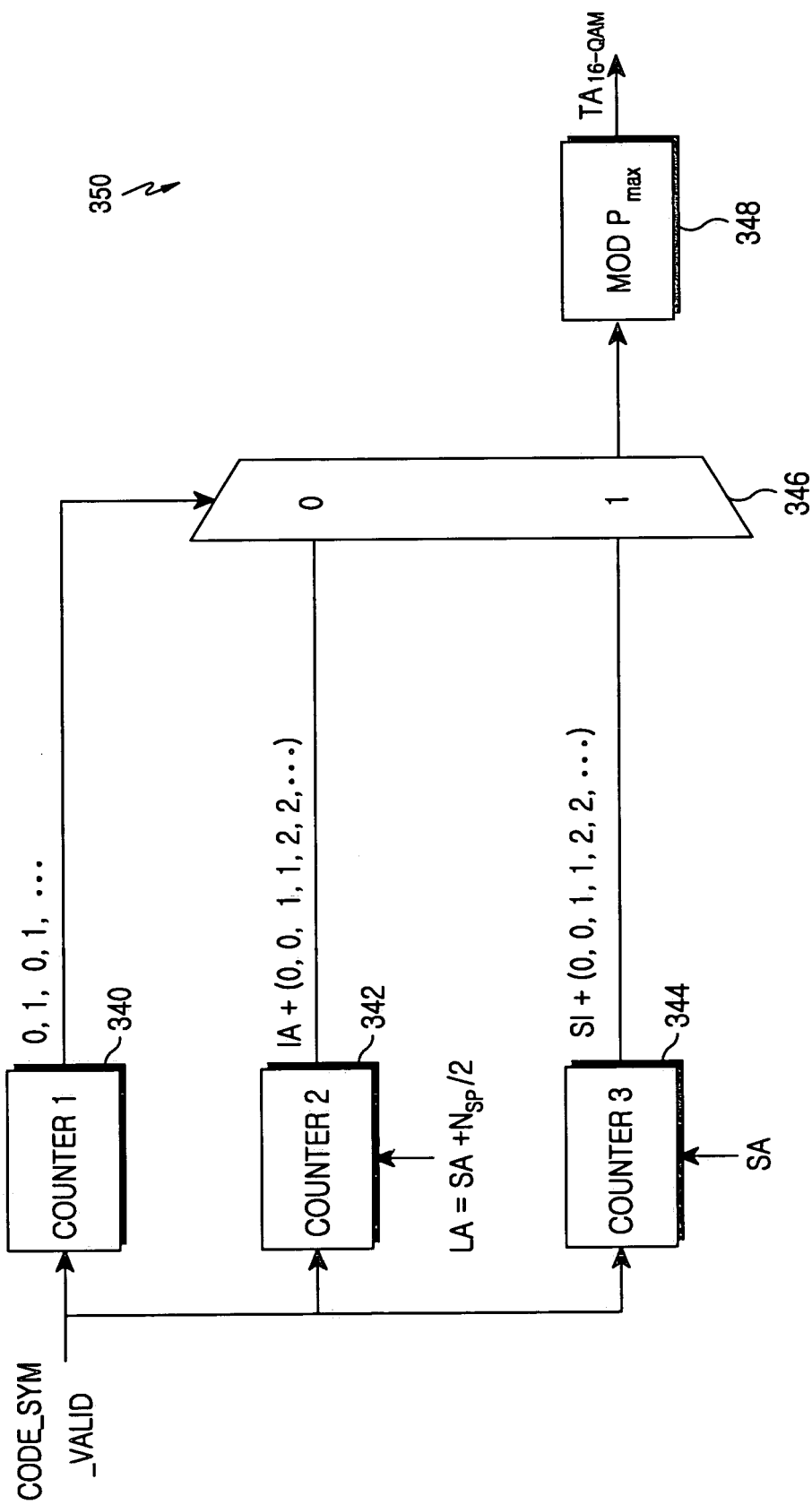
FIG. 11 is a block diagram illustrating an example of a third TA generator for generating TAs for 16-QAM according to the embodiment of the present invention.

FIG. 11 is a block diagram illustrating an example of a third TA generator 350 for generating TAs for 16-QAM according to the embodiment of the present invention. As illustrated, data deshuffling is performed by Eq. (3). The third TA generator 350 operates similarly to the second TA generator 332, Each time the clock signal CODE_SYM_VALID is applied from the demodulator 210, first, second and third counters 340, 342 and 344 generate different code symbol indexes ci in parallel. The first counter 340 sequentially outputs 0, 1, 0, 1, .... The second counter 342 starts with IA defined as "SA+$N_{EP}$/2" and sequentially outputs IA, IA, IA+1, IA+1, IA+2, IA+2, ..., each having 14 bits. The third counter 424 starts with SA and sequentially outputs SA, SA, SA+1, SA+1, SA+2, SA+2, ..., each having 14 bits.

A selector 346 alternately selects the outputs of the second and third counters 342 and 344 according to the output of the first counter 340. A modulo operator 348 modulo-operates the output of the selector 346 with $P_{MAX}$ and outputs the modulo-operated value as a 13-bit TA ($TA_{16\text{-}QAM}$). Hence, the outputs of the second and third counters 342 and 344 correspond to TAs when "ci mod 2"=0 and 1, respectively.

Figure 12:
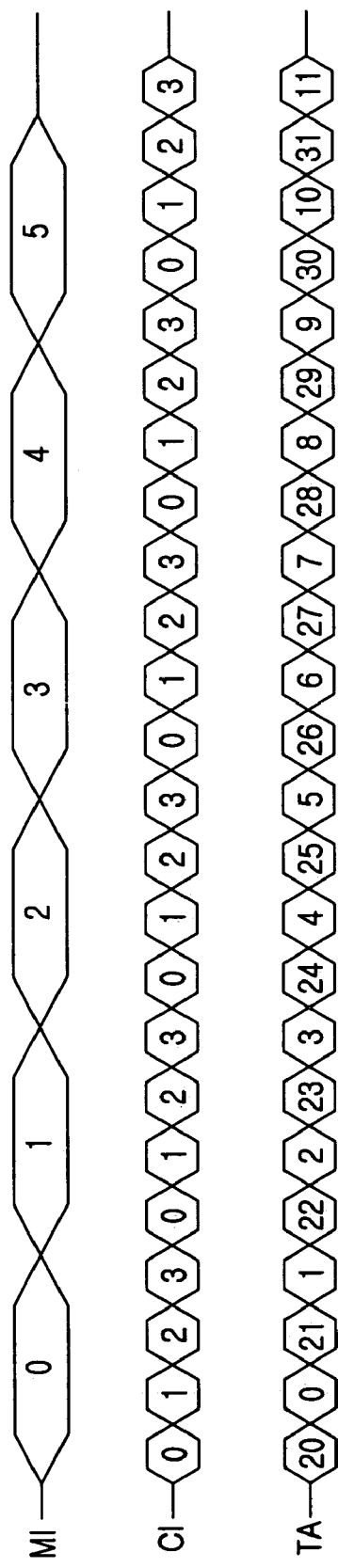
FIG. 12 is a diagram illustrating an example of TAs generated from the third TA generator illustrated in FIG. 11.

Given mi and ci, the second TA generator 350 generates TAs under the conditions that SA=0 and $N_{SP}$=40, as illustrated in FIG. 12. If mi=0 and ci=0, TA=$N_{SP}/2$=20. If mi=0 and ci=1, the TA=0. If mi=0 and ci=2, TA=21. If mi=0 and ci=3, TA=1.

That is, for 16-QAM, TA sequentially increases from an initial value $N_{SP}/2$ according to mi, if ci is an even number, and it sequentially increases from an initial value 0 according to mi, if ci is an odd number.

2. WA Generation

WA generation is related to the structure of the deshuffling buffer. Referring to FIG. 2, the deshuffling buffer 220 is comprised of the three memories 232, 234 and 236 as described previously, in order to simultaneously read a systematic symbol and first and second parity symbols during data reading in the constituent decoders of the turbo decoder 260 for decoding one information symbol. Therefore, systematic symbols, first parity symbols, and second parity symbols are stored separately in the memories 232, 234 and 236.

One of the memories 232, 234 and 236 is selected according to whether data to be stored at a TA is a systematic or a parity symbol and the TA is converted to a WA. As illustrated in FIG. 6, the manner of storing data in each memory of the deshuffling buffer varies according to an EP size.

If $N_{EP}$=408, 792 or 1560 bits, received packet data contains S, P0, P0', P1/P1'. On the other hand, if $N_{EP}$=2328, 3096 or 3864 bits, received packet data contains part of S, P0, P0', P1/P1'. Therefore, this must be considered when generating WAs.

If $N_{EP}$=408, 792 or 1560 bits, WA is generated using TA by i) $0<TA<N_{EP}$

Input Symbols=S, WA=TA: Write to QRAM0 (RAM_CS=0)

ii) $N_{EP}<TA<3\times N_{EP}$

Input Symbols=P0 or P0', WA=TA-$N_{EP}$: Write to QRAM1 (RAM_CS=1)

iii) $3\times N_{EP}<TA<5\times N_{EP}$

Input Symbols=P1 or P1', WA=TA-$3\times N_{EP}$: Write to QRAM2 (RAM_CS=2) (4)

If $N_{EP}$=2328 bits, WA is generated using TA by i) $0<TA<N_{EP}$

Input Symbols=S, WA=TA: Write to QRAM0 (RAM_CS=0)

ii) $N_{EP}<TA<3\times N_{EP}$ if ((TA-$N_{EP}$) mod 2=0),

Input Symbols=P0, WA=(TA-$N_{EP}$)/2: Write to QRAM1 (RAM_CS=1)

else

Input Symbols=P0', WA=(TA-$N_{EP}$)/2: Write to QRAM2 (RAM_CS=2)

iii) TA>$3\times N_{EP}$ if ((TA-$3\times N_{EP}$) mod 2=1),

Input Symbols=P1', WA=(TA-$3\times N_{EP}$)/2+2328: Write to QRAM1 (RAM_CS=1)

else

Input Symbols=P1, WA=(TA-$3\times N_{EP}$)/2+2328: Write to QRAM2 (RAM_CS=2) (5)

If $N_{EP}$=3096 or 3864 bits, WA is generated using TA by i) $0<TA<N_{EP}$

Input Symbols=S, WA=TA: Write to QRAM0 (RAM_CS=0)

ii) TA>$N_{EP}$ if ((TA-$N_{EP}$) mod 2=0),

Input Symbols=P0, WA=(TA-$N_{EP}$)/2: Write to QRAM1 (RAM_CS=1)

else

Input Symbols=P0', WA=(TA-$N_{EP}$)/2: Write to QRAM2 (RAM_CS=2) (6)

In the above equations, TA is a temporary address, $N_{EP}$ is an EP size, and WA is a final write address at which to store demodulated data in the deshuffling buffer 220. RAM_CS is a chip select signal indicative of a selected memory for storing a symbol. Thus WA is an address in a corresponding memory. Which symbol to be stored among S, P0, P0', P1/P1' is determined according to an EP size and a TA. Therefore, which memory and which WA to store an input symbol at can be determined.

Figure 13:
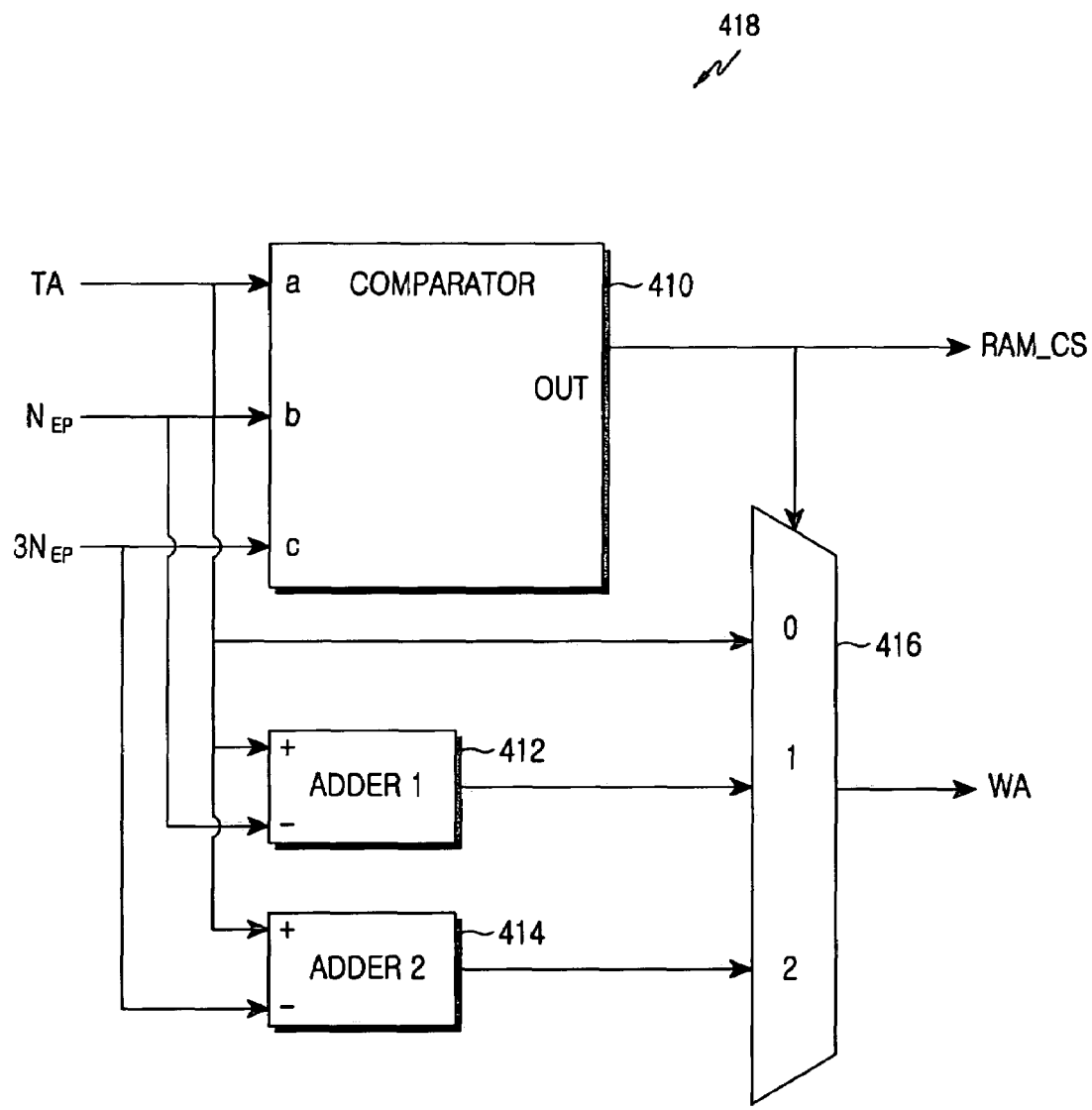
FIG. 13 is a block diagram illustrating an example of the structure of a first final address generator for generating a final address Write Address ($WA_1$) when an EP size is 408, 792 or 1560 bits according to the embodiment of the present invention.

FIG. 13 is a block diagram illustrating an example of the structure of a first final address generator 418 for generating a final address $WA_1$ when $N_{EP}$=408, 792 or 1560 bits according to the embodiment of the present invention. $WA_1$ is generated by Eq. (4).

For the input of a, b and c, a comparator 410 outputs 0 in two bits if a<b. If a<c, it outputs 1 in two bits and otherwise, it outputs 2 in two bits. Here, a, b and c are connected respectively to TA, $N_{EP}$, and $3\times N_{EP}$. The output of the comparator 410 is a 2-bit memory select signal RAM_CS.

A first adder (adder 1) 412 subtracts $N_{EP}$ from TA and a second adder (adder 2) 414 subtracts $3\times N_{EP}$ from TA. A selector 416 selects TA, "TA-$N_{EP}$" output from the first adder 412, or "TA-$3\times N_{EP}$" output from the second adder 414 according to the output of the comparator 410 and outputs the selected as a 12-bit final address $WA_1$.

Figure 14:
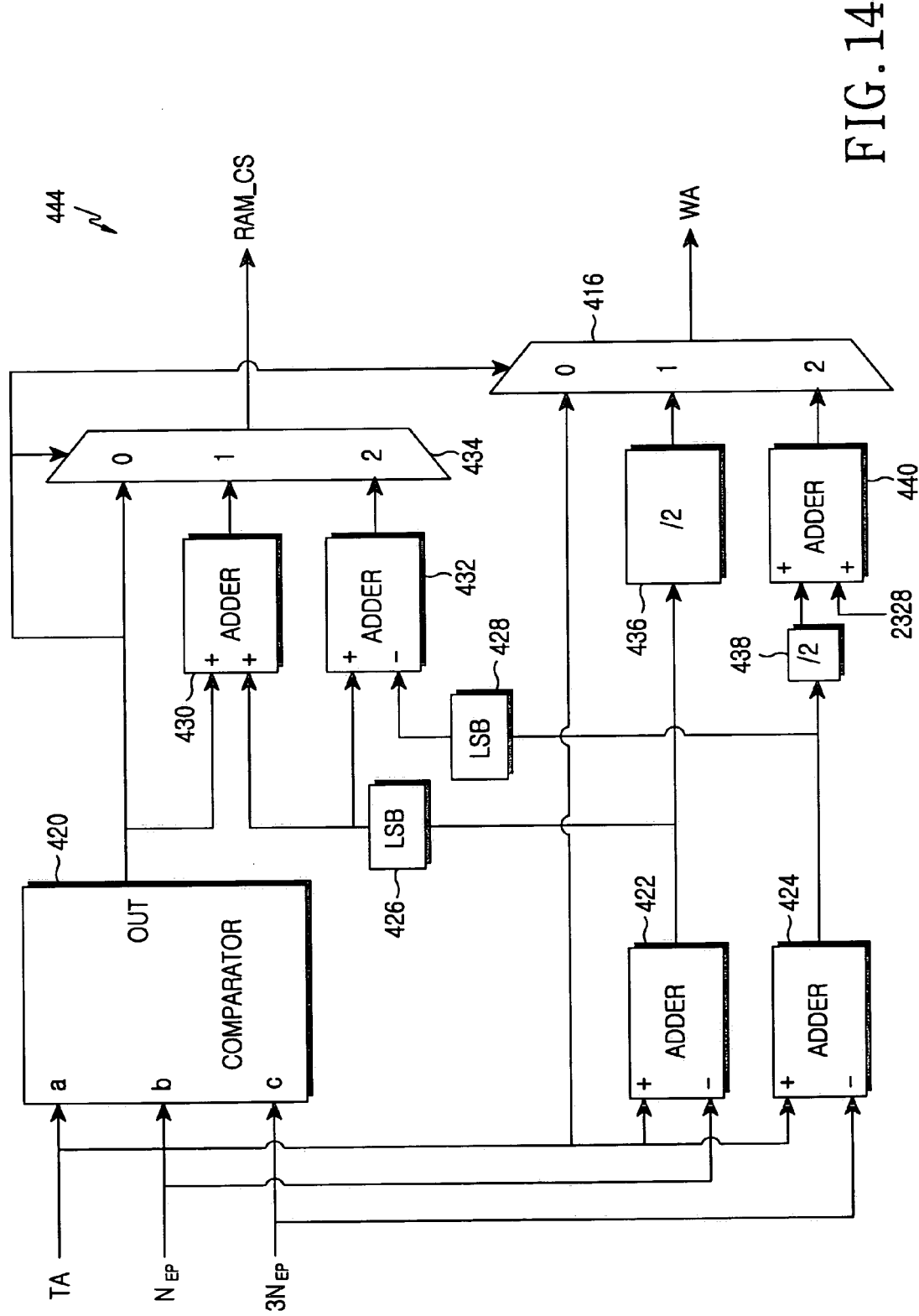
FIG. 14 is a block diagram illustrating an example of the structure of a second final address generator for generating a final address $WA_2$ when an EP size is 2328, 3096 or 3864 bits according to the embodiment of the present invention.

FIG. 14 is a block diagram illustrating an example of the structure of a second final address generator 418 for generating a final address $WA_2$ when $N_{EP}$=2328, 3096 or 3864 bits according to the embodiment of the present invention. $WA_2$ is generated by Eq. (5) or Eq. (6).

For the input of a, b and c, a comparator 420 outputs 0 if a<b. If a<c, it outputs 1 and otherwise, it outputs 2. Here, a, b and c are connected respectively to TA, $N_{EP}$, and $3\times N_{EP}$. The output of the comparator 420 is provided as a select signal and a first input for a first selector 434.

A first adder 422 subtracts $N_{EP}$ from TA and a second adder 424 subtracts $3\times N_{EP}$ from TA. A first LSB (Least Significant Bit) extractor 426 detects a first LSB "(TA-$N_{EP}$) mod 2" by the modulo-2 operation of "TA-$N_{EP}$" received from the first adder 422 and a second LSB extractor 428 detects a second LSB "(TA-$3\times N_{EP}$) mod 2" by the modulo-2 operation of "TA-$3\times N_{EP}$" received from the second adder 422.

A third adder 430 subtracts the first LSB received from the first LSB extractor 426 from the output of the comparator 420 and provides the difference as a second input for the selector 434. A fourth adder 432 subtracts the second LSB received from the second LSB extractor 428 from the output of the comparator and provides the difference as a third input for the selector 434. The first selector 434 selects one of the outputs of the comparator 420, the third adder 430, and the fourth adder 432 and outputs the selected as a 2-bit memory select signal RAM_CS.

Meanwhile, the output of the comparator 420 is provided as a select signal for a second selector 442. A first input to the second selector 442 is TA, its second input is the quotient of dividing the output of the first adder 422 by 2 in a first divider 436, and its third input is the result from dividing the output of the second adder 424 by 2 in a second divider 438 and adding 2328 to the quotient in a fifth adder 440. The second selector 442 selects TA, "(TA-$N_{EP}$)/2" output from the first divider 436, or "(TA-$N_{EP}$)/2+2328" output from the fifth adder 440 according to the output of the comparator 420 and outputs the selected as a 12-bit final address WA.

Figure 15:
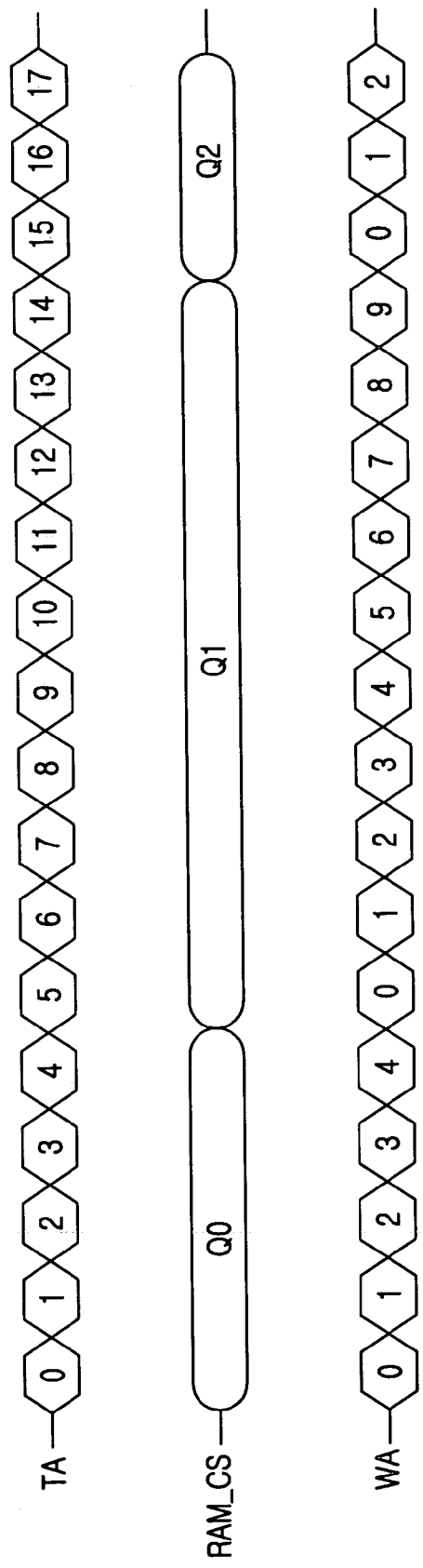
FIG. 15 is a diagram illustrating an example of memory select signals and final addresses generated according to input TAs for QPSK.
Figure 16:
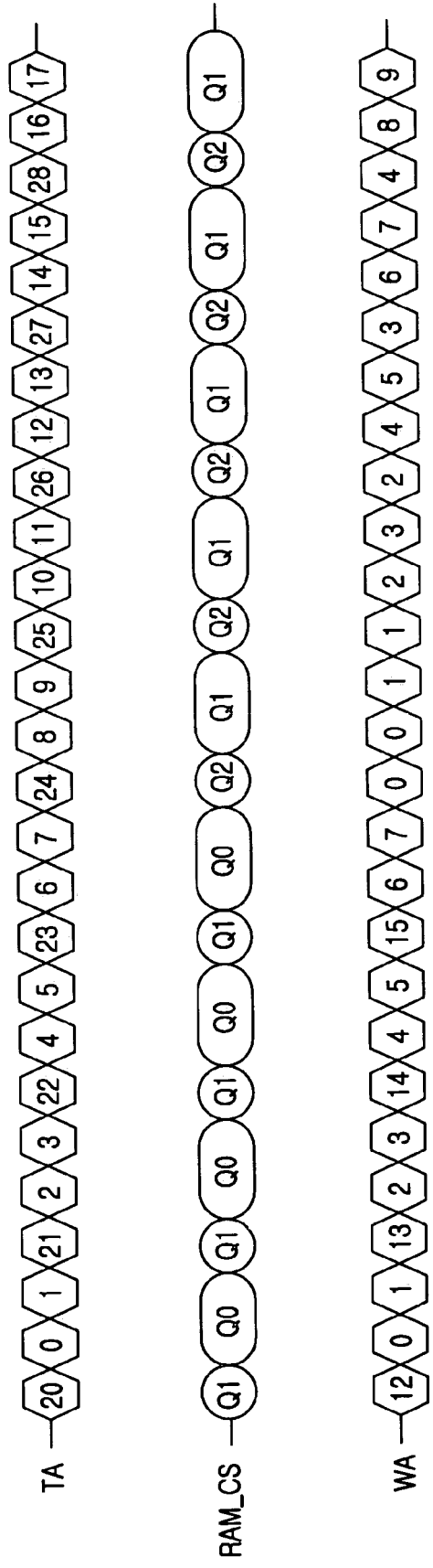
FIG. 16 is a diagram illustrating an example of memory select signals and final addresses generated according to input TAs for 8-PSK.
Figure 17:
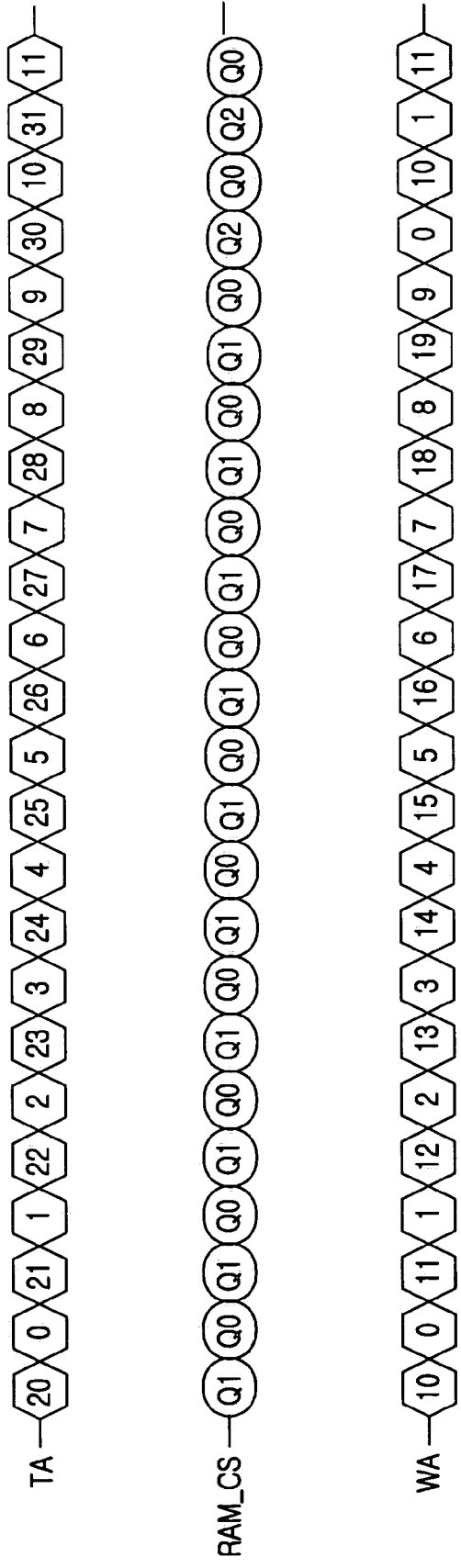
FIG. 17 is a diagram illustrating an example of memory select signals and final addresses generated according to input TAs for 16-QAM.

FIGS. 15, 16 and 17 illustrate examples of WAs and memory select signals RAM_CS generated using TAs illustrated in FIGS. 8, 10 and 12 according to modulation schemes. For notational simplicity, an EP size provided below is a very small value, not a real value. For $N_{EP}$=408, 792, or 1560, Eq. (4) is used as a WA generation formula, and for $N_{EP}$=2328, 3096, or 3864, Eq. (5) or Eq. (6) is used.

FIG. 15 illustrates memory select signals RAM_CS and WAs according to input TAs for QPSK. Here, $N_{EP}$=5. Referring to FIG. 15, since TAs are sequentially generated in QPSK, the memory select signals RAM_CS and the WAs are generated, while the sequential TAs are compared with $N_{EP}$.

FIG. 16 illustrates memory select signals RAM_CS and WAs for 8-PSK, which are generated by comparing TAs with $N_{EP}$ and $3 \times N_{EP}$. Here, $N_{EP}=8$. Referring to FIG. 16, TAs, which are not sequential in 8-PSK, are compared with $N_{EP}$ and $3 \times N_{EP}$ and $(TA-N_{EP})$ or $(TA-3 \times N_{EP})$ becomes a WA according to the comparison result.

FIG. 17 illustrates memory select signals RAM_CS and WAs for 16-QAM. Here, $N_{EP}=10$. Similarly to the operation for 8-PSK, the memory select signals and WAs are generated.

In accordance with the present invention as described above, a transmitter shuffles systematic symbols and parity symbols prior to transmission, and considers different reliabilities between bits, thereby increasing transmission reliability in a communication system adopting multi-level modulation. A receiver deshuffles received data rapidly and thus recovers the original codeword sequence.

Particularly, since the systematic symbols and the parity symbols are stored separately in a deshuffling buffer, they are read simultaneously for decoding. Therefore, decoding time is further shortened. In the-case of too a large parity symbol size, the parity symbols are partially stored in a parity symbol memory, saving memory capacity.

Furthermore, demodulated data is stored in the deshuffling buffer according to a deshuffling rule, instead of using a sequence demapper, and a decoder sequentially reads the stored data. Hence, deshuffling speed is increased and the need for using a separate buffer for sequence demapping is obviated. As a result, the present invention enables high-rate data communication.

While the invention has been shown and described with reference to a certain embodiment thereof in the context of specific modulation schemes, coding method, and packet data lengths, it is a mere exemplary application. Also, a reception buffer is implemented with three memories to further increase decoding speed in the embodiment of the present invention, it can be further contemplated as another embodiment that data deshuffling is performed according to TAs described above using a single memory. In this case, the WA generation procedure is unnecessary. Therefore, it will be understood by those skilled in the art that various changes in form and details may be made therein without departing from the spirit and scope of the invention as defined by the appended claims.

What is claimed is:

1. A method of receiving encoded and then shuffled data in a communication system supporting multi-level demodulation, comprising the steps of:
   demodulating received data according to a predetermined demodulation scheme and outputting a modulation symbol having a predetermined number of code symbols;
   deshuffling the code symbols in a deshuffling order corresponding to shuffling, the deshuffling order being determined considering the demodulation scheme and a structure of a deshuffling memory device; and
   reading the deshuffled code symbols, decoding the code symbols at a predetermined code rate, and outputting a packet.

2. The method of claim 1, wherein in the deshuffling step, the code symbols are stored at write addresses in the deshuffling memory device, which are generated according to a selected one of a plurality of predetermined demodulation schemes using a corresponding one of a plurality of formulas wherein i) if QPSK, then $WA=(SA+2\times mi+ci) \bmod P_{MAX}$, ii) if 8-PSK, then if $ci=0$, $WA=(SA+mi+2N_{SP}/3) \bmod P_{MAX}$ else $WA=(SA+2\times mi+ci-1) \bmod P_{MAX}$, iii) if 16-QAM, then if $ci \bmod 2=0$, $WA=(SA+2\times mi+ci/2+N_{SP}/2) \bmod P_{MAX}$ else $WA=(SA+2\times mi+ci/2) \bmod P_{MAX}$, and wherein WA is a write address, SA is a start address depending on the index of received packet data, mi is the index of a demodulated symbol, ci is the index of a code symbol in the demodulated symbol, $N_{SP}$ is the length of the received packet data, $P_{MAX}$ is the maximum bit index of packet data generated from a code sequence according to a packet size, and mod represents a modulo operation.

3. The method of claim 1, wherein in the code symbol deshuffling step, the code symbols are separated into systematic symbols with a relatively high priority and parity symbols with a relatively low priority, and the systematic symbols and the parity symbols are stored in separate memories.

4. The method of claim 3, wherein the code symbol deshuffling step further comprises the steps of:
   generating temporary addresses according to the deshuffling order considering the demodulation scheme;
   generating write addresses using the temporary addresses considering the separate memories; and
   storing the code symbols at the write addresses in the separate memories.

5. The method of claim 1, wherein the code symbol deshuffling step comprises the steps of:
   separating the code symbols into systematic symbols with a relatively high priority and parity symbols with a relatively low priority, and storing the systematic symbols and the parity symbols in separate memories;
   generating temporary addresses according to the deshuffling order according to the demodulation scheme;
   generating write addresses using the temporary addresses considering the separate memories; and storing the code symbols at the write addresses in the separate memories.

6. The method of claim 5, wherein the temporary addresses are generated according to a selected one of a plurality of predetermined demodulation schemes using a corresponding one of a plurality of formulas wherein i) if QPSK, then $TA=(SA+2\times mi+ci) \bmod P_{MAX}$, ii) if 8-PSK, then if $ci=0$, $TA=(SA+mi+2N_{SP}/3) \bmod P_{MAX}$ else $TA=(SA+2\times mi+ci-1) \bmod P_{MAX}$, and iii) if 16-QAM, then if $ci \bmod 2=0$, $TA=(SA+2\times mi+ci/2+N_{SP}/2) \bmod P_{MAX}$ else $TA=(SA+2\times mi+ci/2) \bmod P_{MAX}$;

wherein TA is a temporary address, SA is a start address depending on the index of received packet data, mi is the index of a demodulated symbol, ci is the index of a code symbol in the demodulated symbol, $N_{SP}$ is the length of the received packet data, $P_{MAX}$ is the maximum bit index of packet data generated from a code sequence according to an packet size, and mod represents a modulo operation.

7. The method of claim 5, wherein if the packet is 408, 792 or 1560 bits, the write addresses are generated according to at least one formula selected from i) if $0<TA<N_{EP}$, then Input Symbols=S, $WA=TA$, and Write to MEM0 (MEM_CS=0), ii) if $N_{EP}<TA<3\times N_{EP}$, then Input Symbols=P0 or P0', WA=TA-$N_{EP}$, and Write to MEM1 (MEM_CS=1), and iii) if $3\times N_{EP}<TA<5\times N_{EP}$, then Input Symbols=P1 or P1', WA=TA-$3\times N_{EP}$, and Write to MEM2 (MEM_CS=2);

wherein TA is a temporary address, $N_{EP}$ is an packet size, S denotes systematic symbols, P0/P0' denotes first parity symbols, P1/P1' denotes second parity symbols, WA is a final write address, MEM_CS is a memory select signal, and MEM0, MEM1 and MEM2 denote first, second and third memories, respectively.

8. The method of claim 5, wherein if the packet is 2328 bits, the write addresses are generated according to at least one formula selected from i) if $0<TA<N_{EP}$, then Input Symbols=S, WA=TA: Write to MEM0 (MEM_CS=0), ii) if $N_{EP}<TA<3\times N_{EP}$, then if ((TA-$N_{EP}$) mod 2=0), then Input Symbols=P0, WA=(TA-$N_{EP}$)/2, and Write to MEM1 (MEM_CS=1)

else

Input Symbols=P0', WA=(TA-$N_{EP}$)/2, and Write to MEM2 (MEM_CS=2), and iii) if $TA>3\times N_{EP}$, then if ((TA-$3\times N_{EP}$) mod 2=1), then Input Symbols=P1', WA=(TA-$3\times N_{EP}$)/2+2328, and Write to MEM1 (MEM_CS=1)

else

Input Symbols=P1, WA=(TA-$3\times N_{EP}$)/2+2328, and Write to MEM2 (MEM_CS2);

wherein TA is a temporary address, $N_{EP}$ is an packet size, S denotes systematic symbols, P0/P0' denotes first parity symbols, P1/P1' denotes second parity symbols, WA is a final write address, MEM_CS is a memory select signal, MEM0, MEM1 and MEM2 denote first, second and third memories, respectively, and mod represents a modulo operation.

9. The method of claim 5, wherein if the packet is 3096 or 3864 bits, the write addresses are generated according to at least one formula selected from i) if $0<TA<N_{EP}$, then Input Symbols=S, WA=TA, and Write to MEM0 (MEM_CS0), ii) if $N_{EP}<TA<3\times N_{EP}$, then if ((TA-$N_{EP}$) mod 2=0), then Input Symbols=P0, WA=(TA-$N_{EP}$)/2, and Write to MEM1 (MEM_CS=1)

else

Input Symbols=P0', WA=(TA-$N_{EP}$)/2, and Write to MEM2 (MEM_CS=2), and iii) if $TA>3\times N_{EP}$, then if ((TA-$3\times N_{EP}$) mod 2=1), then Input Symbols=P1', WA=(TA-$3\times N_{EP}$)/2+2328, and Write to MEM2 (MEM_CS=1) else Input Symbols=P1', WA=(TA-$3\times N_{EP}$)/2+2328, and Write to MEM2 (MEM_CS=2);

wherein TA is a temporary address, $N_{EP}$ is an packet size, S denotes systematic symbols, P0/P0' denotes first parity symbols, P1/P1' denotes second parity symbols, WA is a final write address, MEM_CS is a memory select signal, MEM0, MEM1 and MEM2 denote first, second and third memories, respectively, and mod represents a modulo operation.

10. The method of claim 1, wherein the demodulation scheme is a multi-level demodulation scheme having a demodulation order of 3 or higher.

11. An apparatus for receiving encoded and then shuffled data in a communication system supporting multi-level demodulation, comprising:
  a demodulator for demodulating received data according to a predetermined demodulation scheme and outputting a modulation symbol having a predetermined number of code symbols;
  a storage for storing the code symbols in a deshuffling order corresponding to shuffling, the deshuffling order being determined considering the demodulation scheme and the structure of the storage; and
  a decoder for reading the stored code symbols, decoding the code symbols at a predetermined code rate, and outputting a packet.

12. The apparatus of claim 11, wherein the storage stores the code symbols at write addresses generated according to a selected one of a plurality of predetermined demodulation schemes using a corresponding one of a plurality of formulas wherein i) if QPSK, then WA=(SA+$2\times mi+ci$) mod $P_{MAX}$, ii) if 8-PSK, then if ci=0, WA=(SA+mi+$2N_{SP}$/3) mod $P_{MAX}$ else WA=(SA+$2\times mi+ci-1$) mod $P_{MAX}$, iii) if 16-QAM, then if ci mod 2=0, WA=(SA+$2\times mi+ci/2+N_{SP}/2$) mod $P_{MAX}$ else WA=(SA+$2\times mi+ci/2$) mod $P_{MAX}$;

wherein WA is a write address, SA is a start address depending on the index of received packet data, mi is the index of a demodulated symbol, ci is the index of a code symbol in the demodulated symbol, $N_{SP}$ is the length of the received packet data, $P_{MAX}$ is the maximum bit index of packet data generated from a code sequence according to an packet size, and mod represents a modulo operation.

13. The apparatus of claim 11, wherein the storage comprises:
  a first memory for storing systematic symbols with a relatively high priority among the code symbols;
  at least one second memory separate from the first memory, for storing parity symbols with a relatively low priority among the code symbols; and
  a write address generator for generating a memory select signal indicating one of the first and second memories each time a code symbol is received and a write address indicating a memory area at which the code symbol is to be stored in the selected memory according to a deshuffling order corresponding to shuffling.

14. The apparatus of claim 13, wherein the write address generator comprises:

a temporary address generator for generating a temporary addresses according to the deshuffling order considering the demodulation scheme; and a final address generator for generating the memory select signal and the write address using the temporary addresses considering the separate memories.

15. The apparatus of claim 11, wherein the storage comprises:

a first memory for storing systematic symbols with a relatively high priority;

second and third memories separate from the first memory, for storing first and second parity symbols with a relatively low priority;

a temporary address generator for generating a temporary addresses according to the deshuffling order considering the demodulation scheme; and a final address generator for generating the memory select signal and the write address using the temporary addresses considering the separate memories.

16. The apparatus of claim 15, wherein the temporary address is generated according to a selected one of a plurality of predetermined demodulation schemes using a corresponding one of a plurality of formulas wherein i) if $QPSK$, then $TA=(SA+2\times mi+ci)$ mod $P_{MAX}$, ii) if $8$-$PSK$, then if $ci=0$, $TA=(SA+mi+2N_{Sp}/3)$ mod $P_{MAX}$ else $TA=(SA+2\times mi+ci-1)$ mod $P_{MAX}$, and iii) if $16$-$QAM$, then if $ci$ mod $2=0$, $TA=(SA+2\times mi+ci/2+N_{Sp}/2)$ mod $P_{MAX}$ else $TA=(SA+2\times mi+ci/2)$ mod $P_{MAX}$;

wherein TA is a temporary address, SA is a start address depending on the index of received packet data, mi is the index of a demodulated symbol, ci is the index of a code symbol in the demodulated symbol, $N_{Sp}$ is the length of the received packet data, $P_{MAX}$ is the maximum bit index of packet data generated from a code sequence according to an packet size, and mod represents a modulo operation.

17. The apparatus of claim 15, wherein if the packet is 408, 792 or 1560 bits, the write address is generated by at least one formula selected from i) if $0<TA<N_{EP}$, then Input Symbols=$S$, $WA=TA$, and Write to MEM0 (MEM_$CS$=0), ii) if $N_{EP}<TA<3\times N_{EP}$, then Input Symbols=$P0$ or $P0'$, $WA=TA-N_{EP}$, and Write to MEM1 (MEM_$CS$=1), and iii) if $3\times N_{EP}<TA<5\times N_{EP}$, then Input Symbols=$P1$ or $P1'$, $WA=TA-3\times N_{EP}$, and Write to MEM2 (MEM_$CS$=2);

wherein TA is a temporary address, $N_{EP}$ is an packet size, S denotes systematic symbols, P0/P0' denotes first parity symbols, P1/P1' denotes second parity symbols, WA is a final write address, MEM_CS is a memory select signal, MEM0, MEM1 and MEM2 denote first, second and third memories, respectively, and mod represents a modulo operation.

18. The apparatus of claim 15, wherein if the packet is 2328 bits, the write address is generated by at least one formula selected from i) if $0<TA<N_{EP}$, then Input Symbols=$S$, $WA=TA$, and Write to MEM0 (MEM_$CS$=0), ii) if $N_{EP}<TA<3\times N_{EP}$, then if $((TA-N_{EP})$ mod $2=0)$, then Input Symbols=$P0$, $WA=(TA-N_{EP})/2$, and Write to MEM1 (MEM_$CS$=1)

else

Input Symbols=$P0'$, $WA=(TA-N_{EP})/2$, and Write to MEM2 (MEM_$CS$=2), and iii) if $TA>3\times N_{EP}$, then $((TA-3\times N_{EP})$ mod $2=1)$, then Input Symbols=$P1'$, $WA=(TA-3\times N_{EP})/2+2328$, and Write to MEM2 (MEM_$CS$=1) else Input Symbols=$P1$, $WA=(TA-3\times N_{EP})/2+2328$, and Write to MEM2 ($MEM\_CS2$);

wherein TA is a temporary address, $N_{EP}$ is an packet size, S denotes systematic symbols, P0/P0' denotes first parity symbols, P1/P1' denotes second parity symbols, WA is a final write address, MEM_CS is a memory select signal, MEM0, MEM1 and MEM2 denote first, second and third memories, respectively, and mod represents a modulo operation.

19. The apparatus of claim 15, wherein if the packet is 3096 or 3864 bits, the write address is generated by i) if $0<TA<N_{EP}$, then Input Symbols=$S$, $WA=TA$, and Write to MEM0 (MEM_$CS$=0), and ii) if $TA>N_{EP}$, then if $((TA-N_{EP})$ mod $2=0)$, Input Symbols $P0$, $WA=(TA-N_{EP})/2$, and Write to MEM1 (MEM_$CS$=1)

else

Input Symbols=$P0'$, $WA=(TA-N_{EP})/2$, and: Write to MEM2 (MEM_$CS$=2);

wherein TA is a temporary address, $N_{EP}$ is an packet size, S denotes systematic symbols, P0/P0' denotes first parity symbols, P1/P1' denotes second parity symbols, WA is a final write address, MEM_CS is a memory select signal, MEM0, MEM1 and MEM2 denote first, second and third memories, respectively, and mod represents a modulo operation.

20. The apparatus of claim 11, wherein the demodulation scheme is a multi-level demodulation scheme having a demodulation order of 3 or higher.

* * * * *